United States Patent
Wells, Jr.

(10) Patent No.: US 12,344,157 B2
(45) Date of Patent: Jul. 1, 2025

(54) SLIP GRAB RATCHET BINDER

(71) Applicant: Columbus McKinnon Corporation, Getzville, NY (US)

(72) Inventor: William P. Wells, Jr., Ider, AL (US)

(73) Assignee: Columbus McKinnon Corporation, Getzville, NY (US)

( * ) Notice: Subject to any disclaimer, the term of this patent is extended or adjusted under 35 U.S.C. 154(b) by 273 days.

(21) Appl. No.: 18/138,576

(22) Filed: Apr. 24, 2023

(65) Prior Publication Data
US 2024/0351509 A1    Oct. 24, 2024

(51) Int. Cl.
*B60P 7/00* (2006.01)
*B60P 7/08* (2006.01)
*F16G 11/12* (2006.01)

(52) U.S. Cl.
CPC ............ B60P 7/083 (2013.01); F16G 11/12 (2013.01)

(58) Field of Classification Search
CPC ................................. B60P 7/083; F16G 11/12
See application file for complete search history.

(56) References Cited

U.S. PATENT DOCUMENTS

| | | |
|---|---|---|
| 2,810,595 A | 10/1957 | Purdy |
| 3,806,265 A | 4/1974 | Hattan |
| 4,537,309 A | 7/1985 | Kawahara |
| 4,830,339 A * | 5/1989 | McGee .................. F16G 11/12 403/44 |
| 5,611,521 A * | 3/1997 | Grover .................. B25B 21/002 254/235 |
| 6,789,384 B2 | 9/2004 | Hungerford |
| 7,556,448 B2 | 7/2009 | Hu |
| 9,526,666 B2 | 12/2016 | Chepurny et al. |
| 10,371,233 B2 | 8/2019 | Dershem |
| 10,814,773 B1 * | 10/2020 | Rainone .................. B60P 7/083 |
| 11,305,684 B1 * | 4/2022 | Szeglin .................. B60P 7/083 |
| 12,031,609 B1 * | 7/2024 | Wells, Jr. ................ F16G 3/006 |
| 2005/0263747 A1 | 12/2005 | Scott et al. |
| 2014/0109361 A1 * | 4/2014 | Helline .................. B60P 7/083 24/68 CD |
| 2014/0326935 A1 * | 11/2014 | Chao ........................ B60P 7/083 254/235 |
| 2020/0001768 A1 | 1/2020 | Andre |
| 2020/0362942 A1 | 11/2020 | Martens |
| 2023/0049274 A1 * | 2/2023 | Conner, Jr. ............. F16G 11/12 |
| 2023/0373379 A1 * | 11/2023 | Scott ........................ B60P 7/083 |
| 2024/0131979 A1 * | 4/2024 | Helline .................. B60P 7/083 |

FOREIGN PATENT DOCUMENTS

EP    0831248 A2    3/1998

OTHER PUBLICATIONS

European Patent Office, European search report dated Sep. 12, 2024.

* cited by examiner

*Primary Examiner* — Emmanuel M Marcelo
(74) *Attorney, Agent, or Firm* — PHILLIPS LYTLE LLP

(57) ABSTRACT

A slip grab ratchet binder with a primary hook having an enlarged diameter portion at a tip. A grab hook has an eyelet for sliding over the primary hook from a proximal end to the tip where it is obstructed from sliding off the primary hook. The grab hook and primary hook work in combination in a ratchet binder device to provide a slip grab ratchet binder for attaching to various hook points.

15 Claims, 4 Drawing Sheets

SLIP GRAB RATCHET BINDER

TECHNICAL FIELD

The present invention relates generally to the field of material handling, and more particularly to a mechanical device used to tighten and secure bindings such as a link chain being used to stabilize and secure heavy cargo or equipment on a cargo carrying vehicle or vessel including, but not limited to, trucks, trains, planes, and ships.

BACKGROUND ART

A standard ratchet binder includes a center tube that has internal left and right hand threads at the tube ends. A threaded shaft moves into and out of each end of the tube. The ends of the shafts are fitted with hooks that hook onto respective chain ends for securing a load and are thereby prevented from turning. Turning of the tube is typically achieved by a ratchet mechanism having a pawl ratchet gear operated with a handle. The handle is worked back and forth to turn the tube relative to the shafts which draws the shafts into the tube and thereby achieves tightening of the chain. The ratchet mechanism can be reversed to extend the shafts from the tube for loosening of the chain binder, again by working the handle back and forth.

BRIEF SUMMARY OF THE INVENTION

With parenthetical reference to the corresponding parts, portions or surfaces of the disclosed embodiment, merely for the purposes of illustration and not by way of limitation, the present invention provides a slip grab ratchet binder (99). The slip grab ratchet binder (99) includes an internally threaded tube (100) having opposing, open ends.

Threaded shafts (103, 112) may be threadably inserted into the opposing open ends of the tube (100). The threads (106, 108) in the tube (100) and the threads (290,299) on the shafts (103, 112) are adapted to provide common contraction and extension of the shafts (103, 112) relative to the tube (100) interior, with the shafts (103, 112) not turning and the tube (100) turning. The threaded shafts (103, 112) have a proximal end (163, 240) received in the tube (100).

A ratchet assembly (105) may be fixed to the tube (100) exterior including gear teeth (118), a pawl (121), and a pawl housing (124) mounted over the gear (115) and pivotal around the gear (115). The pawl (121) may selectively engage the gear teeth (118) and may prevent relative rotation of the housing (124) in a selective one of the rotative directions.

A handle (178) may extend from the housing (124) to provide leverage for an operator to pivot the housing (124) with the pawl (121) engaging the gear (115) of the tube (100) for forced rotation of the tube (100) relative to the shafts (103, 112).

At least one of the threaded shafts (103, 112) has a primary hook (150, 153) at a distal end (160, 245) disposed opposite from the proximal end (163, 240). The primary hook (150, 153) has an enlarged diameter portion (166, 230) at or near the tip (170, 235).

A grab hook (200, 225) has an eyelet (203, 228) at one end. The eyelet (203, 228) is sized to receive at least one of the shafts (103, 112) therethrough.

The grab hook (200, 225) is configured to slide over the proximal end (163, 240) of the shaft (103, 112) and to slide over the shaft (103, 112) and the primary hook (150, 153) until the grab hook (200, 225) reaches the enlarged diameter portion (166, 230) of the primary hook (150, 153) where it is obstructed from sliding any farther.

In another aspect, the grab hook (200, 225) is smaller than the primary hook (150, 153) on the at least one shaft (103, 112).

In another aspect, the primary hook (150, 153) is formed integrally on the at least one shaft (103, 112).

Another aspect of the invention is that the grab hook (200, 225) is configured for connecting to a chain or other small diameter hook point.

Another aspect of the invention is that the enlarged diameter portion (166, 230) is formed in the shape of an oval.

In yet another aspect, the grab hook (200, 225) is sized such that it slides completely off of the at least one shaft (103, 112) at the proximal end (163, 240).

In another aspect, the gap (201, 226) of the grab hook (200, 225) is smaller than the gap (151, 154) of the primary hook (150, 153) on the at least one shaft (103, 112).

DESCRIPTION OF THE PREFERRED EMBODIMENTS

Figure 1:
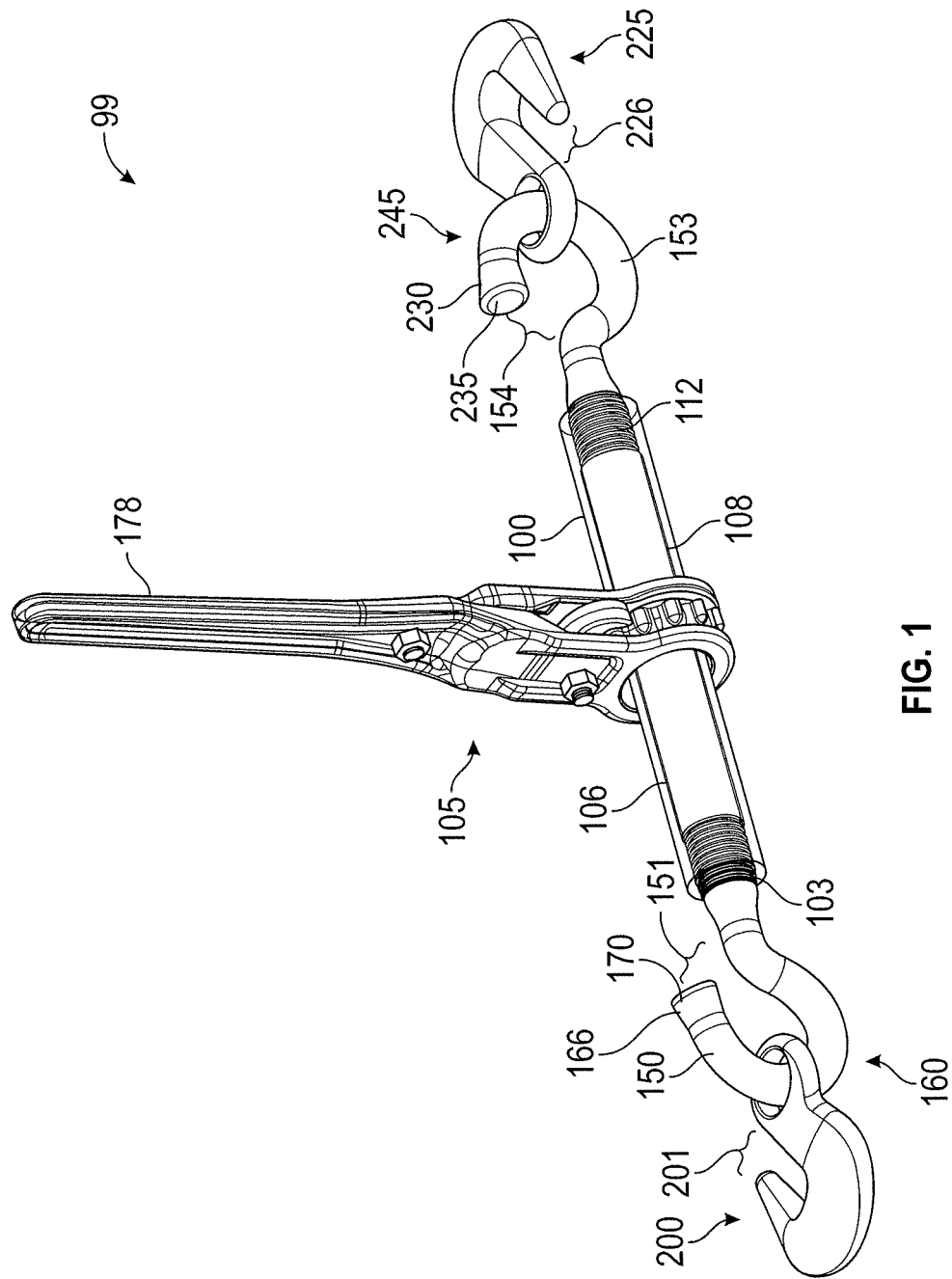
FIG. 1 is a perspective view of a ratcheting binder of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIGS. 1-4 thereof, one embodiment of the invention provides a slip grab ratchet binder 99 that includes a tube 100 with a ratchet assembly 105 fixedly secured to the tube 100. Tube 100 is threaded on the inside with left handed threads 106 on one side and right handed threads 108 on the other side. Shafts 103 and 112 (best shown in FIG. 1) are correspondingly threaded so that rotation of the tube 100 in one direction relative to both shafts 103 and 112 causes both shafts to move inwardly on threads 106, 108 respectively, and rotation of tube 100 in the opposite direction causes both shafts 103 and 112 to move outwardly on threads 106, 108. Thus with the primary hook ends 150, 153 prevented from rotating, e.g. as when hooked to chain links or the like (not shown), rotation of tube 100 produces simultaneous inner or outer movement of both shafts 103, 112.

Figure 4:
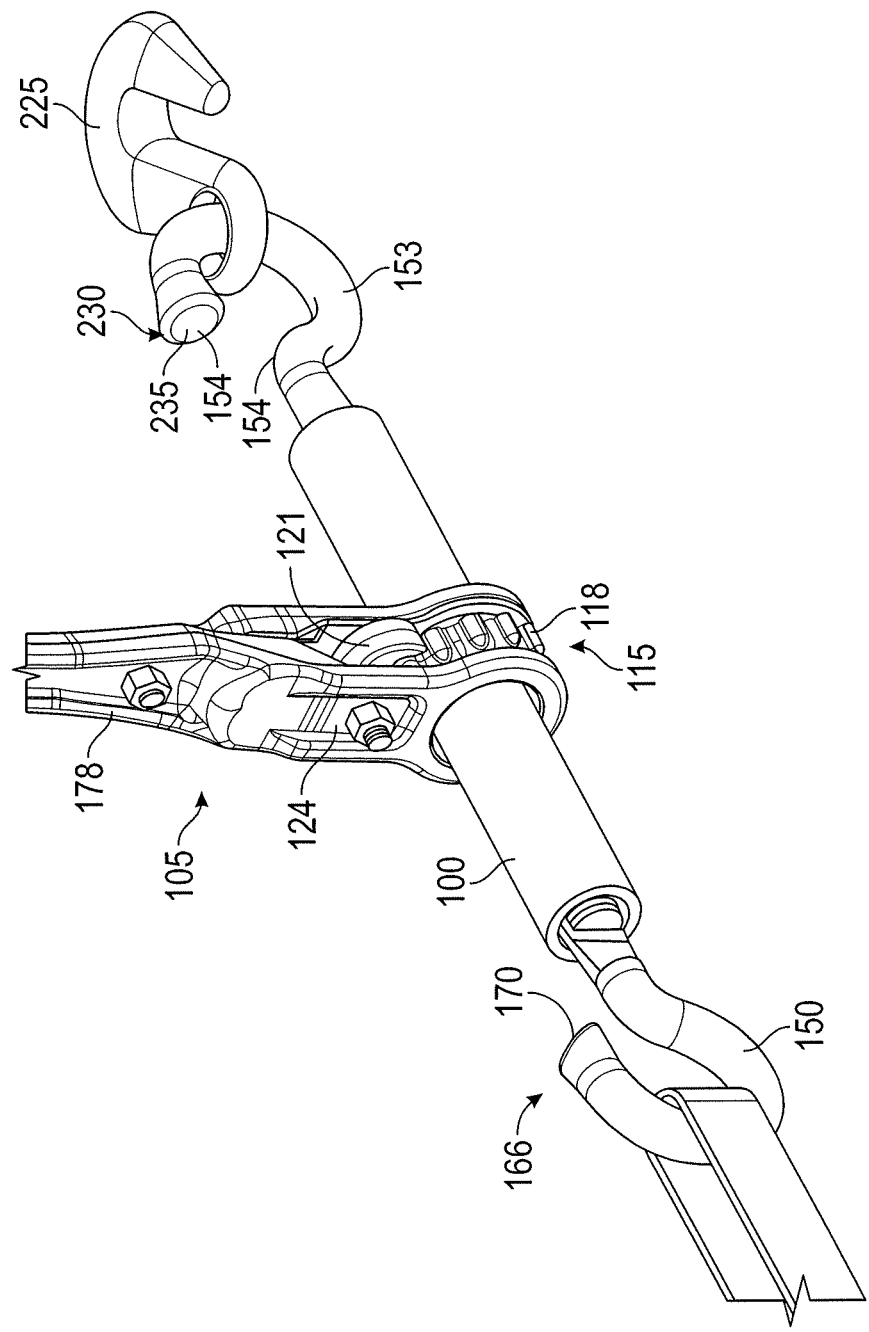
FIG. 4 is a perspective view illustrating another embodiment of the present invention with a captured grab hook at one end and a sling connected to the primary hook at the opposite end.

As shown in FIGS. 1 and 4, the ratchet assembly 105 may be fixed to the exterior surface of the tube 100. As best shown in FIG. 4, the ratchet assembly 105 may include a gear 115 having gear teeth 118, a pawl 121, and a pawl housing 124 mounted over the gear 115 and pivotal around the gear 115. Other devices (including non-ratcheting devices) such as a simple handle attached to the exterior of the tube 100 may also be used for rotating the tube 100 as will be evident to persons of ordinary skill in the art based on this disclosure.

A handle 178 extends from the pawl housing 124 to provide leverage for an operator to pivot the pawl housing 124 with the pawl 121 engaging the gear 115 of the tube 100 for forced rotation of the tube 100 relative to the shafts 103, 112.

Figure 2:
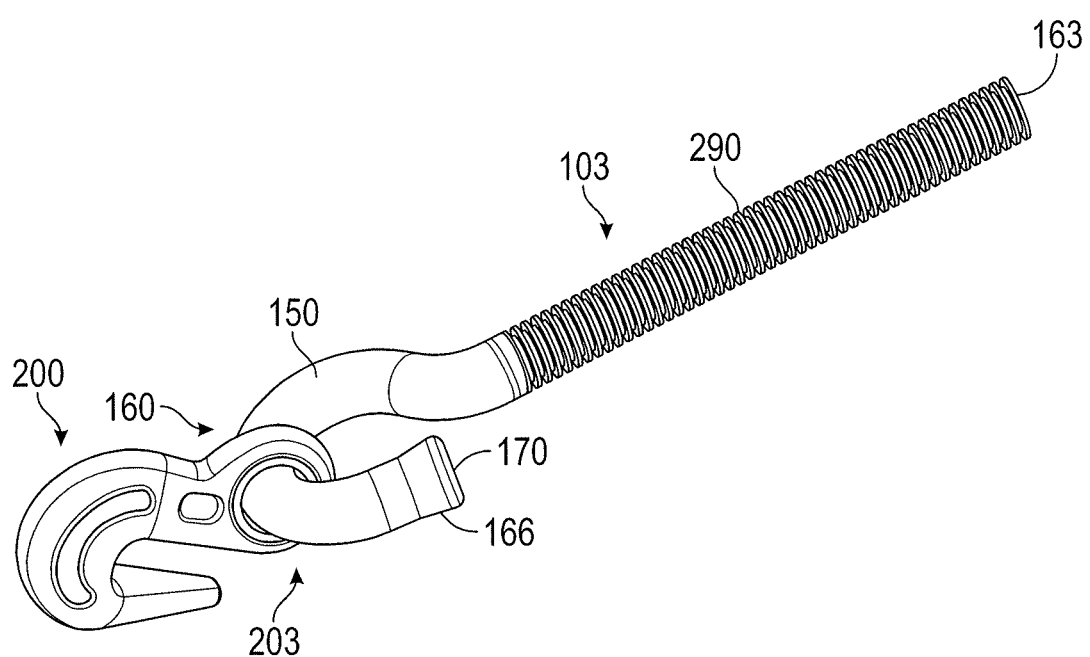
FIG. 2 is a perspective view of a hook configuration at one end of a threaded shaft of one embodiment of the present invention.

Turning to FIG. 2, threaded shaft 103 has primary hook 150 at a distal end 160 disposed opposite from the proximal end 163. The primary hook 150 has an enlarged diameter portion 166 at or near the tip 170. The shaft 103 has threads 290 disposed thereon. In the embodiment shown, the primary hook 150 is formed integrally on the shaft 103. Primary hook 150 has a gap 151 (FIG. 1).

A grab hook 200 has an eyelet 203 at one end 206. The eyelet 203 is sized to receive at least one of the shafts 103 therethrough. The grab hook 200 is configured to slide over the proximal end 163 of the shaft 103 and to slide over the shaft 103 and the primary hook 150 until the grab hook reaches the enlarged diameter portion 166 of the primary hook 150 where it is obstructed from sliding any farther. The grab hook 200 has a gap 201 (FIG. 1).

Figure 3:
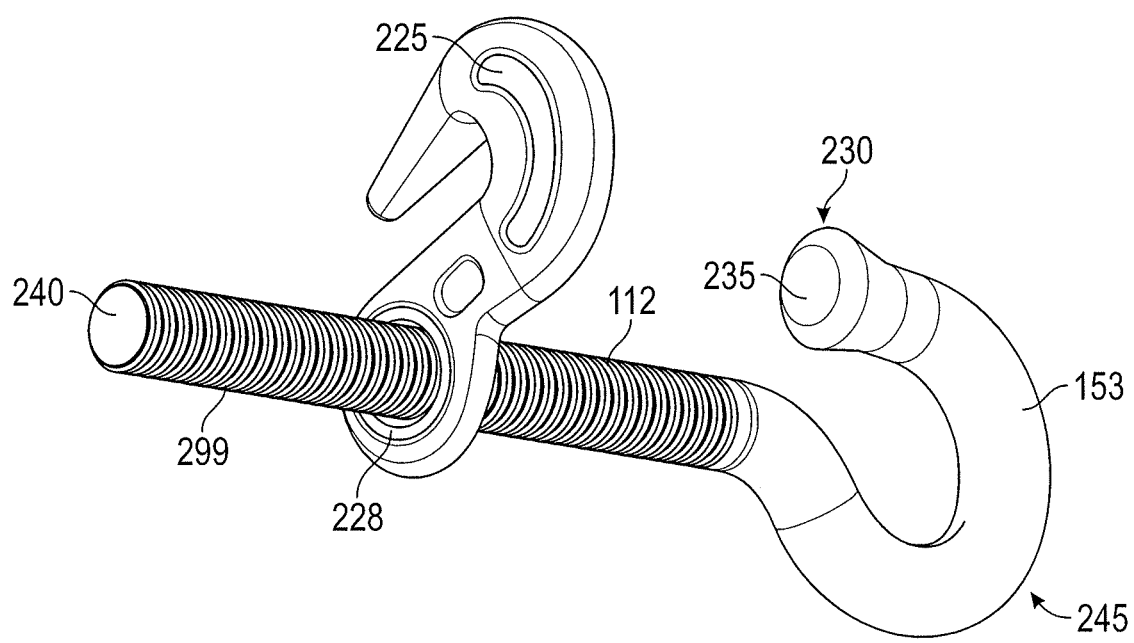
FIG. 3 is a perspective view of a hook configuration from the opposite end of the device.

Turning to FIG. 3, the shaft 112 may be provided with a grab hook 225. Grab hook 225 has a gap 226 (FIG. 1). Primary hook 153 has a gap 154. Primary hook 153 may be provided with an enlarged diameter portion 230 at the tip 235. A proximal end 240 of the shaft 112 is received in the tube 100. A distal end 245 is disposed opposite the proximal end 240. The shaft 112 is provided with threads 299. The grab hook 225 has an eyelet 228 configured to slide onto the shaft 112 at the proximal end 240 and slide over the shaft 112 and primary hook 153 until it reaches the enlarged diameter portion 230.

The grab hook 200, 225 is smaller than the primary hook 150, 153 on the at least one shaft 103, 112.

The primary hook 150, 153 may be formed integrally on the at least one shaft 103, 112.

Another aspect of the invention is that the grab hook 200, 225 is configured for connecting to a chain or other small diameter hook point.

Another aspect of the invention is that the enlarged diameter portion 166, 230 is formed in the shape of an oval.

In yet another aspect, the grab hook 200, 225 is sized such that it slides completely off of the at least one shaft 103, 112 at the proximal end 163, 240.

In another aspect, the gap of the grab hook 200, 225 is smaller than the gap of the primary hook 150, 153 on the at least one shaft 103, 112.

Returning to FIG. 4, the grab hook 225 is positioned at the right hand side of the figure. On the left side, the grab hook 200 has been removed from shaft 103 by sliding it off the proximal end 163. As a result, the primary hook 150 is configured to receive a sling 330. Accordingly, the system provides flexibility at both ends of the device with respect to the type and diameter of hook points that the device can be used with.

The present invention contemplates that many changes and modifications may be made. Therefore, while the presently-preferred form of the slip grab ratchet binder has been shown and described, and several modifications and alternatives discussed, persons skilled in this art will readily appreciate that various additional changes and modifications may be made without departing from the spirit of the invention, as defined and differentiated by the following claims.

The invention claimed is:

1. A slip grab ratchet binder comprising:
an internally threaded tube having opposing, open ends;
threaded shafts threadably inserted into the opposing open ends, the threads in the tube and the threads on the shafts adapted to provide common contraction and extension of the shafts relative to an interior of the tube with the shafts not turning and the tube turning, the threaded shafts having a proximal end received in the tube;
a gear fixed to an exterior of the tube including gear teeth and a pawl and pawl housing mounted over the gear and pivotal around the gear, said pawl selectively engaging the gear teeth and preventing relative rotation of the housing in a selective one of the rotative directions;
a handle extended from said housing to provide leverage for an operator to pivot the housing with the pawl engaging the gear of the tube for forced rotation of the tube relative to the shafts;
at least one of the threaded shafts having a primary hook at a distal end disposed opposite from the proximal end, the primary hook having a tip and having an enlarged diameter portion at or near the tip;
a grab hook having an eyelet at one end, the eyelet sized to receive at least one of the shafts therethrough;
wherein the grab hook is configured to slide over the proximal end of the shaft and to slide over the primary hook until the grab hook reaches the enlarged diameter of the primary hook where it is obstructed from sliding any farther.

2. The slip grab ratchet binder of claim 1, wherein the grab hook is smaller than the primary hook on the at least one shaft.

3. The slip grab ratchet binder of claim 1, wherein the primary hook is formed integrally on the at least one shaft.

4. The slip grab ratchet binder of claim 1, wherein the grab hook is configured for connecting to a chain or other small diameter hook point.

5. The slip grab ratchet binder of claim 1, wherein the enlarged diameter portion is formed in the shape of an oval.

6. The slip grab ratchet binder of claim 1, wherein the grab hook is sized such that it slides completely off of the at least one shaft at the proximal end.

7. The slip grab ratchet binder of claim 1, wherein a gap of the grab hook is smaller than a gap of the primary hook on the at least one shaft.

8. A slip grab ratchet binder comprising:
an internally threaded tube having opposing, open ends;
threaded shafts threadably inserted into the opposing open ends, the threads in the tube and the threads on the shafts adapted to provide common contraction and extension of the shafts relative to an interior of the tube with the shafts not turning and the tube turning, the threaded shafts having a proximal end received in the tube;

means for preventing rotation of the tube relative to the shafts in a selective one of the rotative directions;

means for forcing rotation of the tube relative to the shafts in a selective one of the rotative directions;

at least one of the threaded shafts having a primary hook at a distal end disposed opposite from the proximal end, the primary hook having a tip and having an enlarged diameter portion at or near the tip;

a grab hook having an eyelet at one end, the eyelet sized to receive at least one of the shafts therethrough;

wherein the grab hook is configured to slide over the proximal end of the shaft and to slide over the primary hook until the grab hook reaches the enlarged diameter of the primary hook where it is obstructed from sliding any farther.

9. The slip grab ratchet binder of claim 8, wherein the grab hook is smaller than the primary hook on the at least one shaft.

10. The slip grab ratchet binder of claim 8, wherein the primary hook is formed integrally on the at least one shaft.

11. The slip grab ratchet binder of claim 8, wherein the grab hook is configured for connecting to a chain or other small diameter hook point.

12. The slip grab ratchet binder of claim 8, wherein the enlarged diameter portion is formed in the shape of an oval.

13. The slip grab ratchet binder of claim 8, wherein the grab hook is sized such that it slides completely off of the at least one shaft at the proximal end.

14. The slip grab ratchet binder of claim 8, wherein a gap of the grab hook is smaller than a gap of the primary hook on the at least one shaft.

15. A slip grab ratchet binder comprising:

an internally threaded tube having opposing, open ends;

threaded shafts threadably inserted into the opposing open ends, the threads in the tube and the threads on the shafts adapted to provide common contraction and extension of the shafts relative to an interior of the tube with the shafts not turning and the tube turning, the threaded shafts having a proximal end received in the tube;

a gear fixed to an exterior of the tube including gear teeth and a pawl and pawl housing mounted over the gear and pivotal around the gear, said pawl selectively engaging the gear teeth and preventing relative rotation of the housing in a selective one of the rotative directions;

a handle extended from said housing to provide leverage for an operator to pivot the housing with the pawl engaging the gear of the tube for forced rotation of the tube relative to the shafts;

at least one of the threaded shafts having a primary hook at a distal end disposed opposite from the proximal end, the primary hook having a tip and having an enlarged diameter portion at or near the tip;

a grab hook having an eyelet at one end, the eyelet sized to receive at least one of the shafts therethrough;

wherein the grab hook is configured to slide over the proximal end of the shaft and to slide over the primary hook until the grab hook reaches the enlarged diameter portion of the primary hook where it is obstructed from sliding any farther;

wherein the grab hook is smaller than the primary hook; and, wherein the grab hook is configured to connect to a chain or other smaller diameter hook point.

\* \* \* \* \*